United States Patent
Yao et al.

(10) Patent No.: US 9,715,220 B2
(45) Date of Patent: Jul. 25, 2017

(54) METHOD FOR REAL-TIME CONTROLLING RESIN TRANSFER MOLDING PROCESS

(71) Applicant: National Tsing Hua University, Hsinchu (TW)

(72) Inventors: Yuan Yao, Hsinchu (TW); Pai-Chien Wei, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 387 days.

(21) Appl. No.: 14/612,837

(22) Filed: Feb. 3, 2015

(65) Prior Publication Data

US 2016/0167276 A1 Jun. 16, 2016

(30) Foreign Application Priority Data

Dec. 15, 2014 (TW) .............................. 103143740 A

(51) Int. Cl.
| | | |
|---|---|---|
| *B29C 45/76* | (2006.01) | |
| *G05B 13/02* | (2006.01) | |
| *B29C 70/48* | (2006.01) | |
| *B29C 70/54* | (2006.01) | |

(52) U.S. Cl.
CPC ............ *G05B 13/027* (2013.01); *B29C 70/48* (2013.01); *B29C 70/546* (2013.01)

(58) Field of Classification Search
CPC ......... G29C 45/76; G29C 70/48; G05B 13/27
USPC ................................................ 700/197, 200
See application file for complete search history.

(56) References Cited

U.S. PATENT DOCUMENTS

| | | | | |
|---|---|---|---|---|
| 5,518,385 | A * | 5/1996 | Graff ....................... | B29C 70/48 264/102 |
| 6,325,608 | B1 * | 12/2001 | Shivakumar ............ | C04B 35/83 264/29.5 |
| 6,532,799 | B2 * | 3/2003 | Zhang ..................... | B29C 70/48 264/40.1 |
| 6,853,925 | B2 * | 2/2005 | Daniel .................... | B29C 70/48 702/35 |
| 8,742,872 | B2 * | 6/2014 | Iwasaki ................ | H03H 9/1057 257/415 |
| 8,882,486 | B2 * | 11/2014 | Ueda ....................... | B29C 45/76 264/40.7 |

OTHER PUBLICATIONS

Lee et al., "A prediction method on in-plane permeability of mat/roving fibers laminates in vacuum assisted resin transfer molding", Polymer Composites, 2006, pp. 665-670, vol. 27.

(Continued)

*Primary Examiner* — Chun Cao
(74) *Attorney, Agent, or Firm* — Muncy, Geissler, Olds & Lowe, P.C.

(57) ABSTRACT

The present invention is a method for real-time controlling a resin transfer molding process, which is used to control a filling pressure of a resin in a resin transfer molding (RTM) apparatus. In a pre-control RTM process, the current filling pressure, the current permeability and the wave front position at the current time point is input into a prediction-control model to acquire a predicted filling pressure at the next time point. The predicted filling pressure is used as the filling pressure to make the resin flow to the expected position of the wave front at the next time point, whereby to achieve stable quality of RTM products.

4 Claims, 7 Drawing Sheets

(56) References Cited

OTHER PUBLICATIONS

Ding et al., "In situ measurement and monitoring of whole-field permeability profile of fiber preform for liquid composite molding processes", Composites: Part A: Applied Science and Manufacturing, 2003, pp. 779-789, vol. 34.

Nielsen et al., "Control of Flow in Resin Transfer Molding With Real-Time Preform Permeability Estimation", Polymer Composites, Dec. 2002, pp. 1087-1110, vol. 23, No. 6.

Devillard et al., "On-line Characterization of Bulk Permeability and Race-tracking During the Filling Stage in Resin Transfer Molding Process", Journal of Composite Materials, 2003, pp. 1525-1541, vol. 37, No. 17.

\* cited by examiner

METHOD FOR REAL-TIME CONTROLLING RESIN TRANSFER MOLDING PROCESS

FIELD OF THE INVENTION

The present invention relates to a resin transfer molding technology, particularly to a method using a prediction-control model to real-time control resin flow.

BACKGROUND OF THE INVENTION

The resin transfer molding (RTM) technology has been widely used in many fields. In the RTM process, permeability plays an important role in model building, process control and simulation. Permeability denotes the ability of a fiber material to transport a fluid and functions as an index to evaluate the behavior of filling resin. Therefore, accurate measurement of permeability will favor process simulation and process control greatly and promote the yield of the products of a fiber reinforced polymer (FRP) composite material.

So far, there have been many researches studying the permeability of pre-woven fiber objects (preforms). For example, Lee et al. (Y. J. Lee, J. H. Wu, Y. Hsu, and C. H. Chung) proposed a paper "A prediction method on in-plane permeability of mat/roving fibers laminates in vacuum assisted resin transfer molding," *Polymer Composites*, vol. 27, pp. 665-670, 2006, which derived an equation according to the Darcy's Law, the continuous equation of incompressible fluid, and the in-plane permeabilities of a single type or several types of fiber planes, and defined the thickness-wise porosity to establish a prediction method. The prediction method finally generated a group of equations for predicting the in-plane permeabilities at the top and bottom surfaces of mat preform. The equations exempt the manufacturer from spending much time in permeability measurements.

The prior arts all supposed that the permeability or filling pressure of the preform is a constant. Thus, the acquired permeability is an average permeability. If the manufacturer wants to improve the quality of products, on-line permeability measurement and local permeability measurement are necessary.

The local permeability measurement methods include the Gas-Assisted Real-time Assessment of Permeability (GRASP) proposed by Ding et al. (Li Ding, Chiang Shih, Zhiyong Liang, Chuck Zhang, and Ben Wang) in a paper "In situ measurement and monitoring of whole-field permeability profile of fiber preform for liquid composite molding processes" in *Composites Part A: Applied Science and Manufacturing*, vol. 34, pp. 779-789, 2003; the fuzzy logic model proposed by Pitchumani et al. (D. R. NIELSEN and R. PITCHUMANI) in a paper "Control of Flow in Resin Transfer Molding With Real-Time Preform Permeability Estimation" in *POLYMER COMPOSITES*, vol. 23, pp. 1087-1110, 2002; and the simulation database proposed by Devillard et al. (MATHIEU DEVILLARD, KUANG-TING HSIAO, ALI GOKCE AND SURESH G. ADVAIN) in a paper "On-line Characterization of Bulk Permeability and Race-tracking During the Filling Stage in Resin Transfer Molding Process" in *Journal of COMPOSITE MATERIALS*, vol. 37, pp. 1525-1541, 2003. However, incompleteness of the historical data impairs the validness of the fuzzy logic model and the simulation database.

In the practical RTM process, the non-homogeneous preform, the irregular fiber distribution caused by incorrect operation, or the overused spray glue may result in uneven distribution of permeability, causing the resin to flow toward the low-resistance direction. Thus, the low-permeability regions not completely filled with resin may lead to defects of misruns or dry spots. In order to overcome the problem, the operators manually adjust the process variables, such as the injection pressure, to improve resin flow and the product quality. However, the decisions of the variables lack theoretical groundwork but all rely on the operators' experience.

SUMMARY OF THE INVENTION

The primary objective of the present invention is to overcome the problem of the conventional RTM technology: the adjustments of the process variables are manually adjusted by operators, lacking theoretical groundwork but all rely on the operators' experience.

In order to achieve the abovementioned objective, the present invention proposes a method for real-time controlling a resin transfer molding process, which is used to control the filling pressure of resin in an RTM apparatus. The RTM apparatus comprises a resin supply unit and a molding unit connected with the resin supply unit. The molding unit includes a mold cavity receiving a preform and a plane inside the mold cavity. The method comprises steps:

Step 1: establishing a plurality of groups of process training conditions, wherein the process training conditions include an initial filling pressure;

Step 2: performing a plurality of training processes according to the process training conditions to acquire a permeability, a wave front position at the current time point and a wave front position at the next time point for at a plurality of time points in the training processes, wherein Step 2 further comprises the following steps:

Step 2A: defining on the plane a plurality of detection positions whose number amounts to m×n;

Step 2B: providing a detection module including a pressure transducer unit arranged in the detection positions $y_{m,n}$, at least one image capture device arranged on one side of the plane, and a processing unit electrically connected with the pressure transducer unit and the image capture device, wherein the pressure transducer unit includes m×n pieces of pressure transducers;

Step 2C: filling the resin into the mold cavity with the initial filling pressure and letting the resin flow on the plane along a direction;

Step 2D: using the image capture device to obtain the position of the wave front of the resin in the plane at a time point $t_i$, and defining on the plane a plurality of measurement positions whose number amounts to i×j, wherein the time point $t_i$ and the time point $t_{i-1}$, or the time point $t_{i+1}$ and the time point $t_i$, are separated by a sampling interval, and wherein the measurement position $x_{i,j}$ is a position corresponding to the position of the wave front of the resin at the time point $t_i$, and wherein i denotes the ith sampling time point, and j is an integer related to n;

Step 2E: respectively setting i and j to be preset values a and r, wherein r is an integer greater than 1 and a is an integer greater than or equal to 1, and using the image capture device to obtain the measurement positions $x_{r+1,a}$, $x_{r,a}$ and $x_{r-1,a}$ respectively at the time points $t_{r+1}$, $t_r$, and $t_{r-1}$, and using the pressure transducer nearest to the measurement position $x^{r,a}$ and the wave front of the resin has reached to obtain the pressure $P_{s,a}$ of the wave front at the detection position $y_{s,a}$, wherein $x_{r,a}$ is the wave front position at the current time point and $x_{r+1,a}$ is the wave front position at the next time point in the training process; and Step 2F: using the processing unit to obtain the permeability $K_{r,a}$ at a measurement position $x_{r,a}$ with Equation (1):

$$K_{r,a} = \frac{\mu\phi}{P_{s,a}\Delta T}(x_{r,a} - x_{r-1,a})(x_{r,a} - y_{s,a}) \qquad (1)$$

wherein $\psi$ is the porosity of the preform, $\mu$ the viscosity of the resin, $\Delta T = t_r - t_{r-1}$, whereby is acquired the permeability at a specified position on the plane at the time point $t_i$ in the training process;

Step 2G: repeating Steps 2A-2F to acquire the permeability, the wave front position at the current time point and the wave front position at the next time point of the resin for a plurality of time points in the training process;

Step 3: defining the initial filling pressure, the permeability and the wave front position at the current time point as an input, and defining the wave front position at the next time point as an output; using a data mining technology to establish a prediction-control model involving the input and the output, which is expressed as $$x_{i+1,j} = f(x_{i,j}, P_o, K_{i,j})$$

wherein $P_o$ is the initial filling pressure, $x_{i,j}$ the wave front position at the current time point, $x_{i+1,j}$ the wave front position at the next time point, and the permeability;

Step 4: performing a process to be controlled, which uses Steps 2A-2F to acquire the permeability and the wave front position at the current time point in the process to be controlled, using an optimization algorithm to select at least one candidate filling pressure, and substituting the candidate filling pressure, the permeability and the wave front position at the current time point into the prediction-control model, which is established in Step 3, to acquire at least one candidate wave front position at the next time point corresponding to the candidate filling pressure;

Step 5: comparing the candidate wave front positions at the next time point, which are acquired in Step 4, with the expected wave front position at the next time point to find out the candidate wave front position at the next time point, which is nearest to the expected wave front position at the next time point, and using the result to trace back the corresponding candidate filling pressure;

Step 6: transmitting the candidate filling pressure to the resin supply unit, and using the candidate filling pressure as the filling pressure of the next time point to make the resin flow to the expected position of the wave front position of the next time point.

The present invention further proposes another method for real-time controlling a resin transfer molding process, which is used to control the filling pressure of resin in an RTM apparatus. The RTM apparatus comprises a resin supply unit and a molding unit connected with the resin supply unit. The molding unit includes a mold cavity receiving a preform and a plane inside the mold cavity. The method comprises steps:

Step 1: presetting a plurality of groups of process simulation conditions, wherein the process simulation conditions include an initial filling pressure and a permeability;

Step 2: performing a plurality of simulation processes according to the process simulation conditions to acquire a wave front position at the current time point and a wave front position at the next time point for a plurality of time points in the simulation processes;

Step 3: defining the initial filling pressure, the permeability and the wave front position at the current time point as an input, and defining the wave front position at the next time point as an output; using a data mining technology to establish a prediction-control model involving the input and the output, which is expressed as $$x_{i+1,j} = f(x_{i,j}, P_o, K_{i,j})$$

wherein $P_o$ is the initial filling pressure, $x_{i,j}$ the wave front position at the current time point, $x_{i+1,j}$ the wave front position at the next time point, and $K_{i,j}$ the permeability;

Step 4: performing a process to be controlled, which uses Steps 4A-4F to acquire the permeability and the wave front position at the current time point in the process to be controlled, using an optimization algorithm to select at least one candidate filling pressure, and substituting the candidate filling pressure, the permeability and the wave front position at the current time point into the prediction-control model, which is established in Step 3, to acquire at least one candidate wave front position at the next time point corresponding to the candidate filling pressure, wherein the permeability and the wave front position at the current time point are acquired with the following steps:

Step 4A: defining on the plane a plurality of detection positions $y_{m,n}$ whose number amounts to m×n, Step 4B: providing a detection module including a pressure transducer unit arranged in the detection positions $y_{m,n}$, at least one image capture device arranged on one side of the plane, and a processing unit electrically connected with the pressure transducer unit and the image capture device, wherein the pressure transducer unit includes in m×n pieces of pressure transducers;

Step 4C: filling the resin into the mold cavity with a current filling pressure and letting the resin flow on the plane along a direction;

Step 4D: using the image capture device to obtain the position of the wave front of the resin in the plane at a time point $t_i$, and defining on the plane a plurality of measurement positions $x_{i,j}$, whose number amounts to i×j, wherein the time point $t_i$ and the time point $t_{i-1}$ are separated by a sampling interval, and wherein the measurement position $x_{i,j}$ is a position corresponding to the position of the wave front of the resin at the time point $t_i$, and wherein i denotes the ith sampling time point, and j is an integer related to n;

Step 4E: respectively setting i and j to be preset values a and r, wherein r is an integer greater than 1 and a is an integer greater than or equal to 1, and using the image capture device to obtain the measurement positions $x_{r,a}$ and $x_{r-1,a}$ respectively at the time points $t_r$ and $t_{r-1}$, and using the pressure transducer nearest to the measurement position $x_{r,a}$ and the wave front of the resin has reached to obtain the pressure $P_{s,a}$ of the wave front at the detection position $y_{s,a}$, wherein $x_{r,a}$ is the wave front position at the current time point; and Step 4F: using the processing unit to obtain the permeability $K_{r,a}$ at a measurement position $x_{r,a}$ with Equation (1):

$$K_{r,a} = \frac{\mu\phi}{P_{s,a}\Delta T}(x_{r,a} - x_{r-1,a})(x_{r,a} - y_{s,a}) \qquad (1)$$

wherein $\psi$ is the porosity of the preform, $\mu$ the viscosity of the resin, $\Delta T = t_r - t_{r-1}$, whereby is acquired the permeability at a specified position on the plane at the time point $t_i$;

Step 5: comparing the candidate wave front positions at the next time point, which are acquired in Step 4, with the expected wave front position at the next time point to find out the candidate wave front position at the next time point, which is nearest to the expected wave front position at the next time point, and using the result to trace back the corresponding candidate filling pressure;

Step 6: transmitting the candidate filling pressure to the resin supply unit, and using the candidate filling pressure as the filling pressure of the next time point to make the resin flow to the expected position of the wave front position of the next time point.

The present invention uses the prediction-control model and the optimization algorithm to calculate the filling pressure of the resin at the next time point. Thereby, the resin will flow to the wave front position at the next time point as expected. Thus, the wave front of the resin will advance at a constant velocity, and the quality of the RTM products is guaranteed.

DETAILED DESCRIPTION OF THE PREFERRED EMBODIMENTS

The technical contents of the present invention will be described in detail in cooperation with the drawings below.

Figure 1:
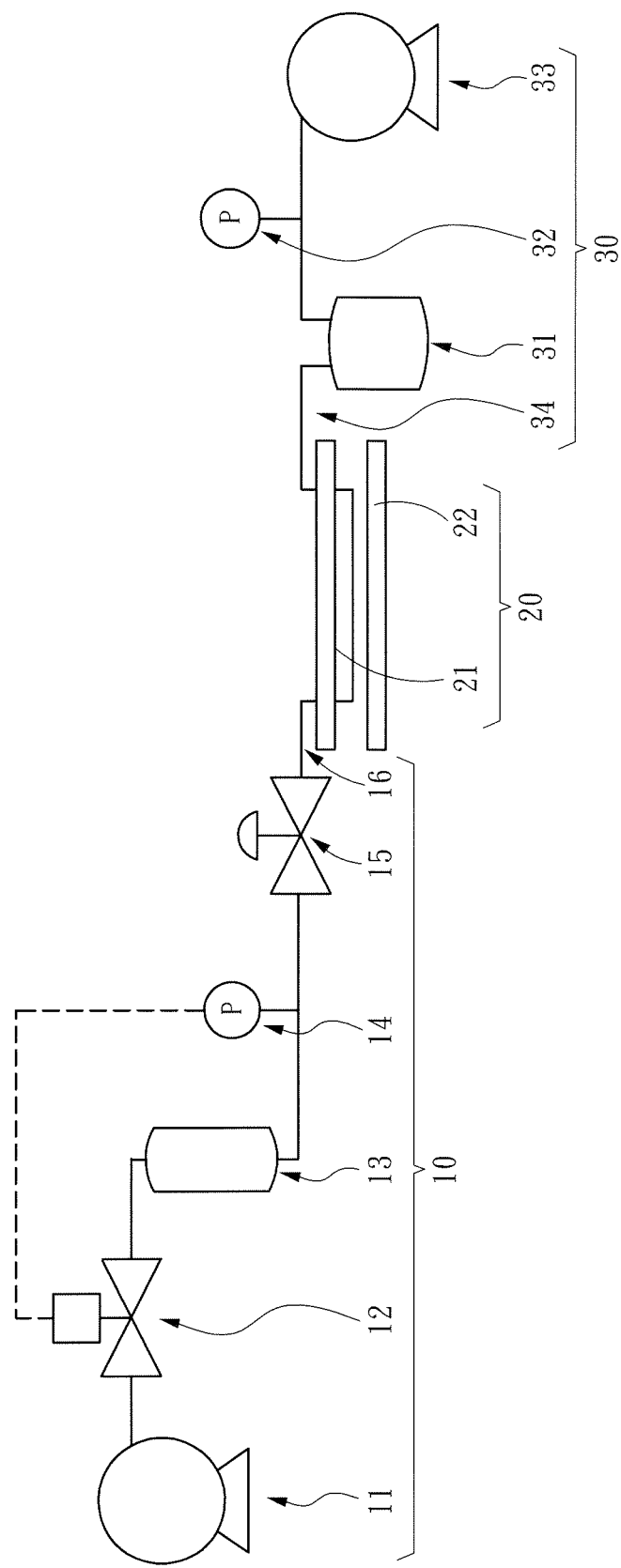
FIG. 1 schematically shows a system layout according to one embodiment of the present invention.
Figure 2:
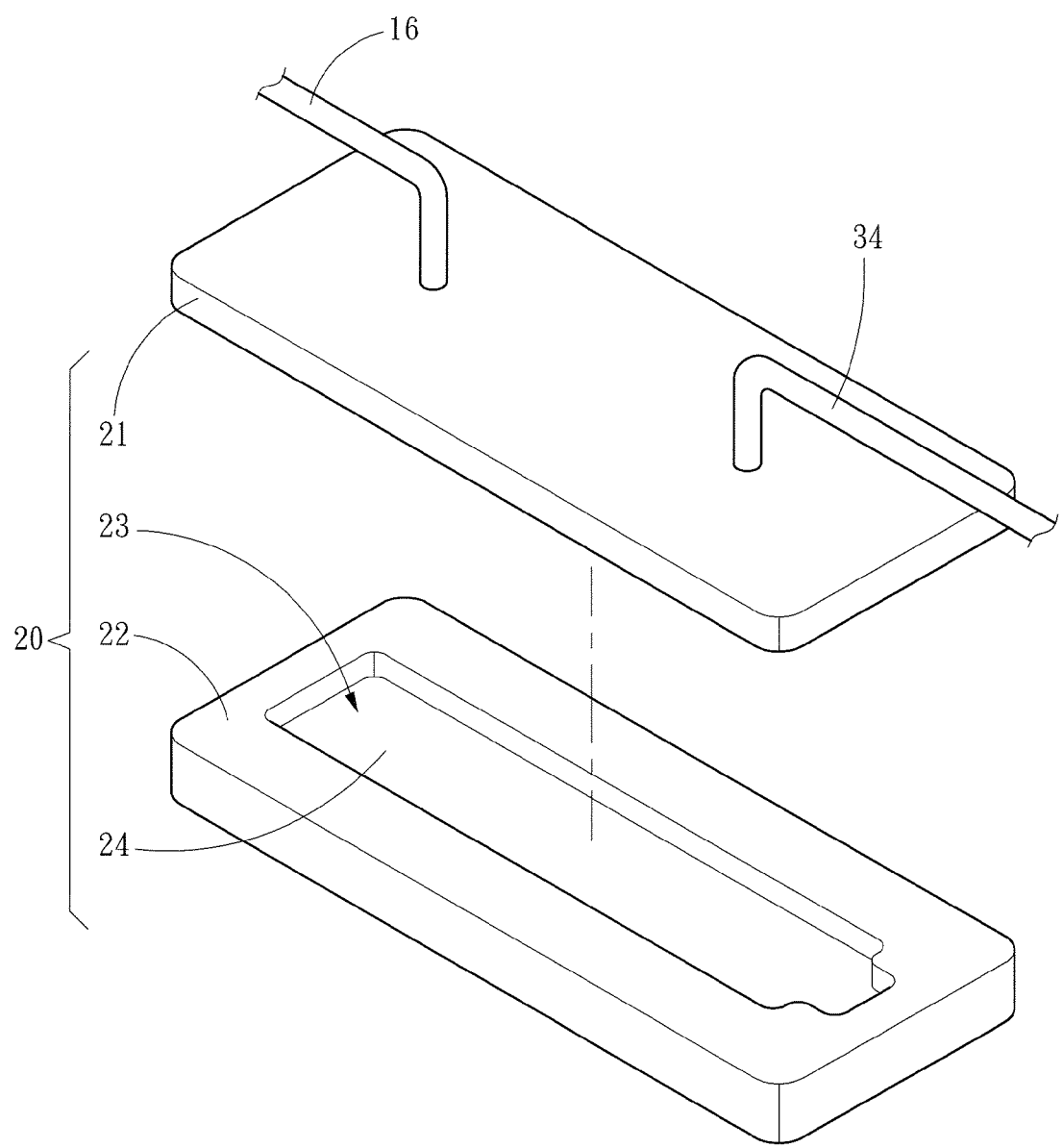
FIG. 2 schematically shows an RTM apparatus according to one embodiment of the present invention.

The present invention proposes a method for real-time controlling a resin transfer molding process, which is used to control the filling pressure of a resin 50 in an RTM apparatus. Refer to FIG. 1 and FIG. 2 respectively schematically showing a system layout according to one embodiment of the present invention and an RTM apparatus according to one embodiment of the present invention. The RTM apparatus comprises a resin supply unit 10 and a molding unit 20 connected with the resin supply unit 10. The molding unit 20 includes an upper mold 21, a lower mold 22, a mold cavity 23 accommodating a pre-woven fiber object (a preform), and a plane 24 inside the mold cavity 23. In the embodiment, the RTM apparatus further comprises a vacuum unit 30; the resin supply unit 10 includes an air compressing portion 11, a pressure regulator 12, a resin tank 13, a front pressure transducer 14, a pneumatic valve 15, and a resin filling piping 16. The vacuum unit 30 includes a vacuum bucket 31, a back pressure transducer 32, a vacuum pump 33, and a vacuum-pumping piping 34. A plurality of first pipes connects the air compressing portion 11, pressure regulator 12, resin tank 13, front pressure transducer 14 and pneumatic valve 15. The resin supply unit 10 is connected with the molding unit 20 through the resin filling piping 16 and thus interconnects with the mold cavity 23, whereby the resin can be filled into the mold cavity 23. A plurality of second pipes connects the vacuum bucket 31, back pressure transducer 32 and vacuum pump 33. The vacuum unit 30 is connected with the molding unit 20 through the vacuum-pumping piping 34 to extract the residual gas from the mold cavity 23.

In a first embodiment, the method of the present invention comprises the steps stated below.

In Step 1, establish a plurality of groups of process training conditions, wherein the process training conditions include an initial filling pressure.

In Step 2, undertake a plurality of training processes according to the process training conditions to acquire a permeability of the resin 50, a wave front position of the resin 50 at the current time point and a wave front position of the resin 50 at the next time point for a plurality of time points of each training process, wherein the permeability, the wave front position at the current time point and the wave front position at the next time point are acquired with Steps 2A-2F.

Figure 3:
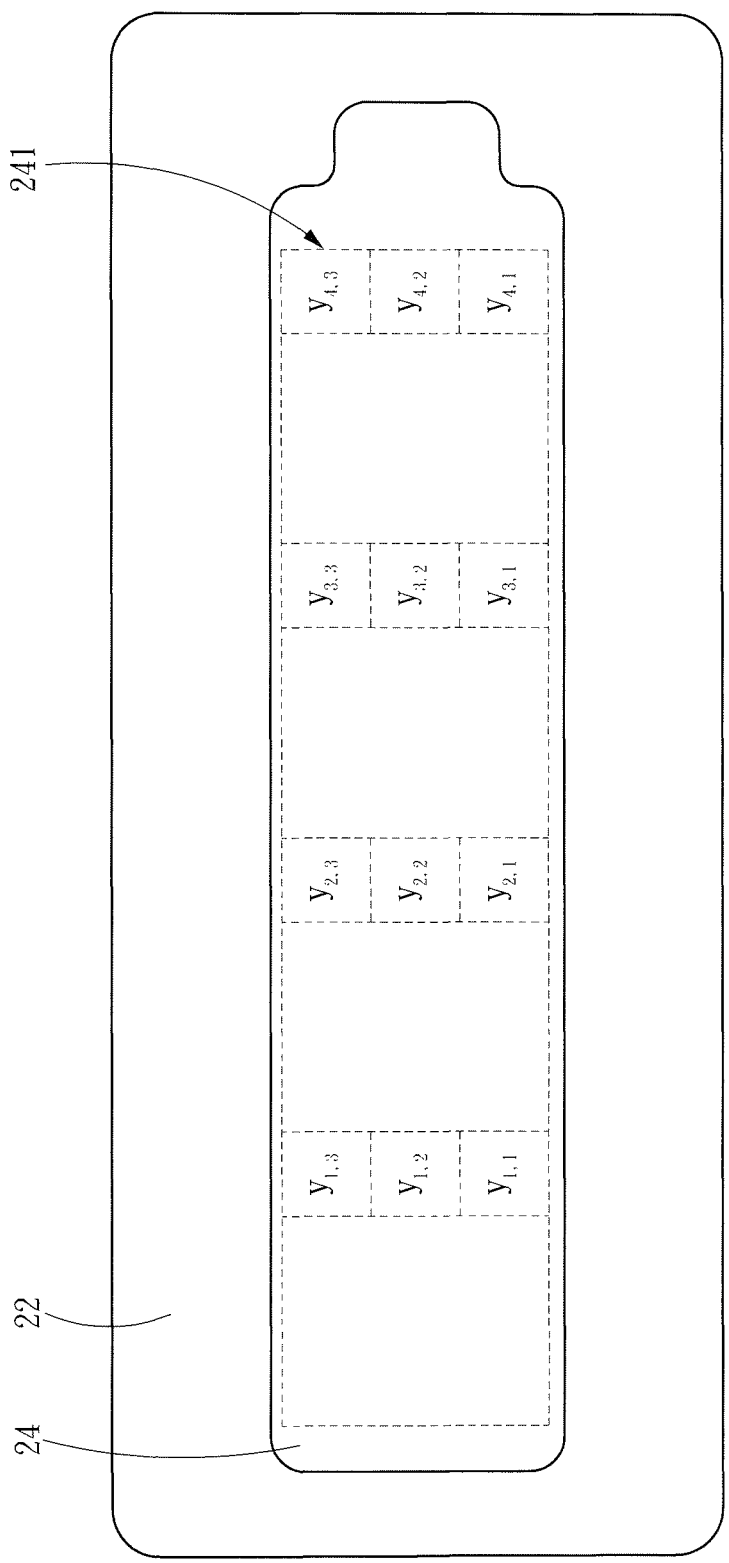
FIG. 3 schematically shows a plane of a molding unit according to a first embodiment of the present invention.

Refer to FIG. 3 schematically showing the plane 24 of the molding unit 20 according to the first embodiment of the present invention. In Step 2A, define on the plane 24 a plurality of detection positions $y_{m,n}$ whose number amounts to m×n. In the first embodiment, the detection positions $y_{m,n}$ are arranged into a matrix-like form having a plurality of longitudinal rows and a plurality of transverse columns. The number of the longitudinal rows is expressed by m, and m=1-4. The number of the transverse columns is expressed by n, and n=1-3.

Figure 4:
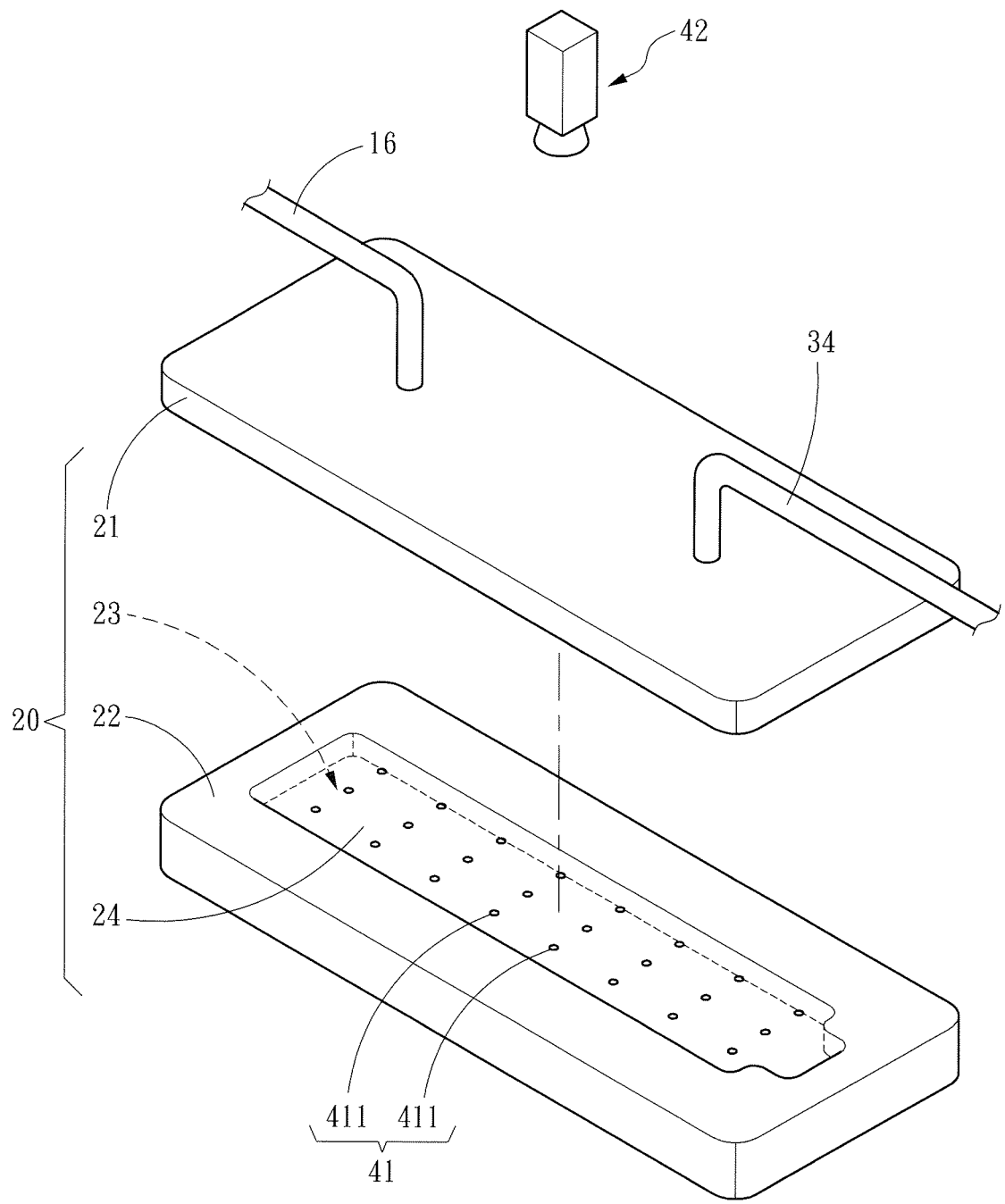
FIG. 4 schematically shows the positions of a detection module according to the first embodiment of the present invention.
Figure 5:
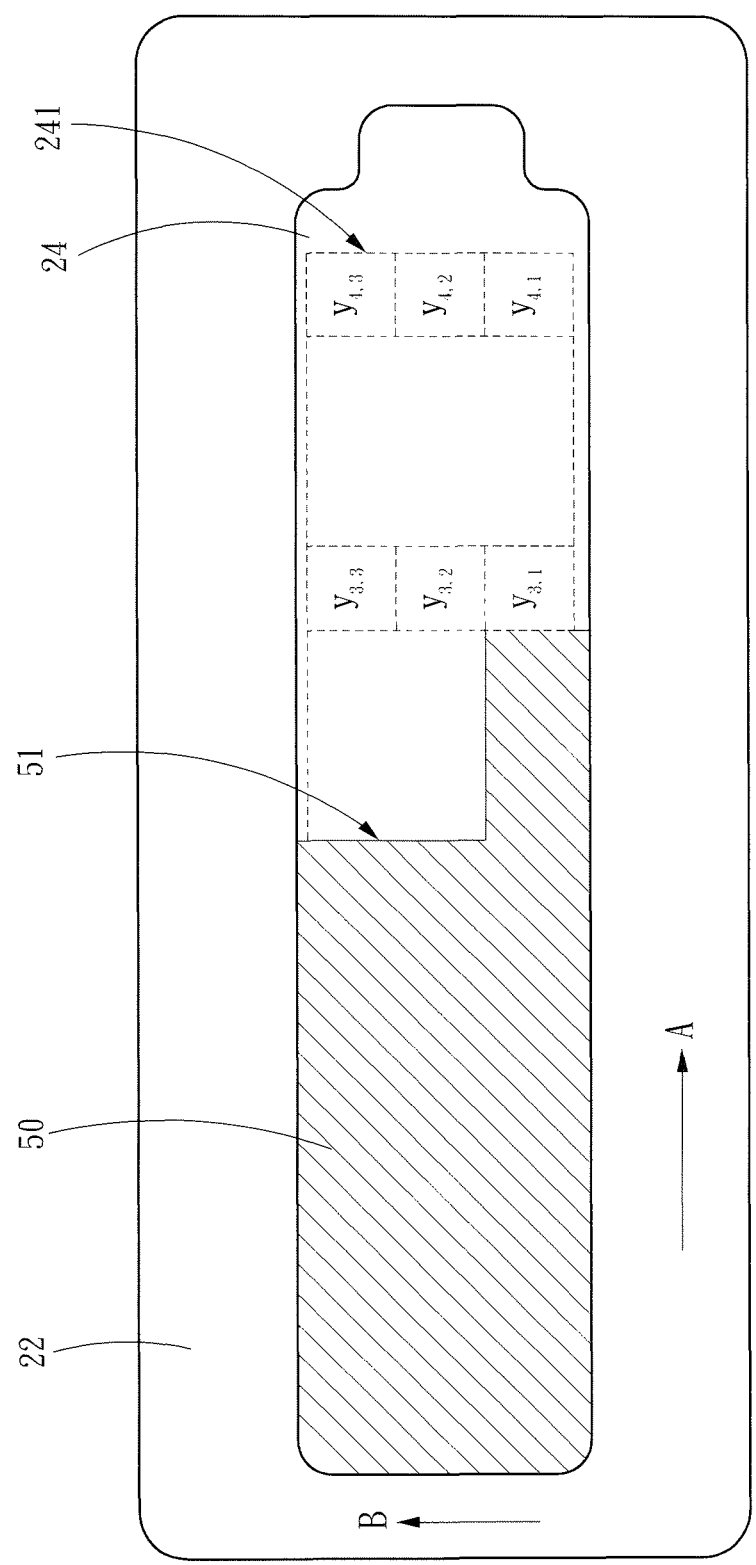
FIG. 5 is a top view schematically showing the detection module according to the first embodiment of the present invention.
Figure 6:
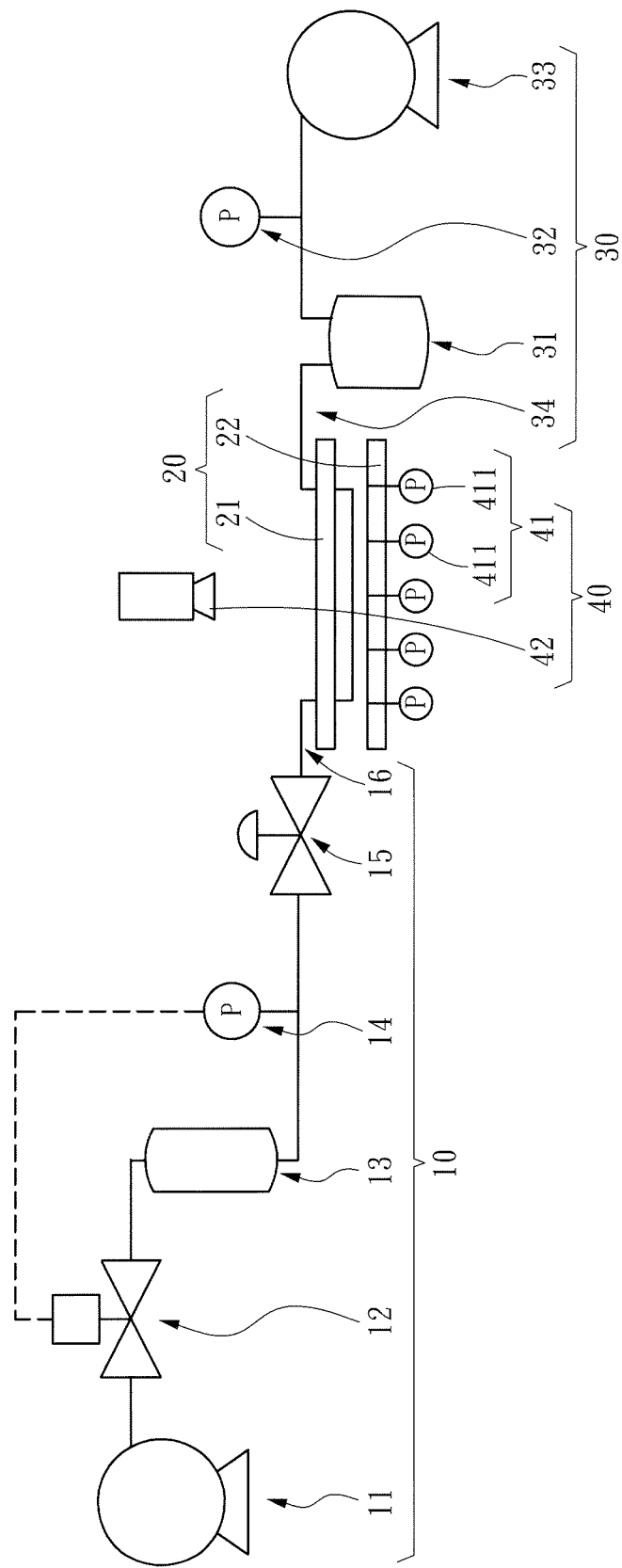
FIG. 6 schematically shows a system layout in Step 2B according to the first embodiment of the present invention.

Refer to FIGS. 4-6 respectively a diagram schematically showing the positions of a detection module, a top view schematically showing a detection module, and a diagram schematically a system layout, according to the first embodiment of the present invention. In Step 2B, provide a detection module 40 including a pressure transducer unit 41, at least one image capture device 42 and a processing unit. The pressure transducer unit 41 is arranged in the detection positions $y_{m,n}$. The image capture device 42 is arranged on one side of the plane 24. The processing unit is electrically connected with the pressure transducer unit 41 and the image capture device 42. The pressure transducer unit 41 includes m×n pieces of pressure transducers 411 arranged corresponding to the detection positions $y_{m,n}$. In the first embodiment, there are totally 12 pieces of pressure transducers 411 also arranged into a matrix-like form having a plurality of longitudinal rows and a plurality of transverse columns.

Figure 7:
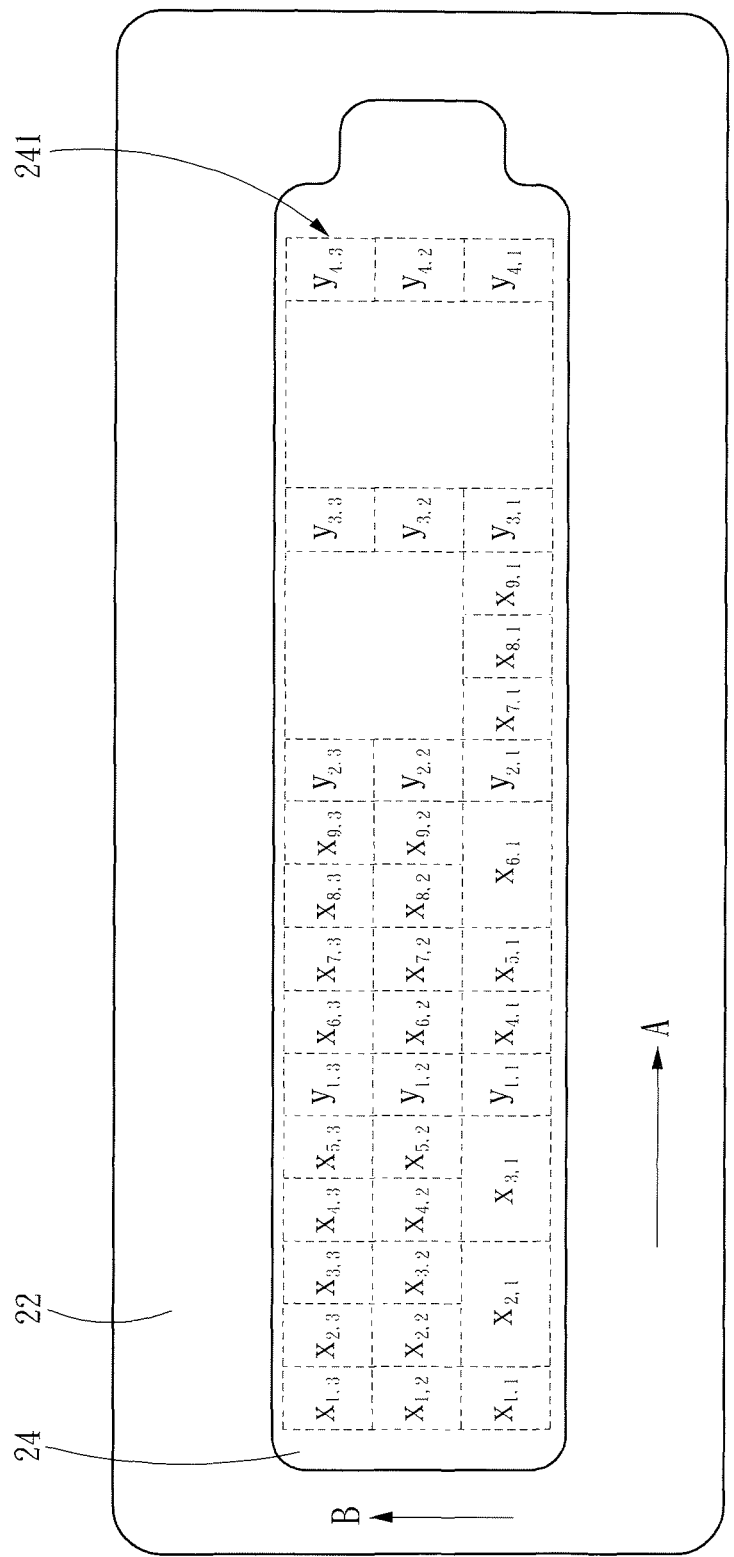
FIG. 7 schematically shows the flowing of the resin according to the first embodiment of the present invention.

Refer to FIG. 7 schematically showing the flowing resin according to the first embodiment of the present invention. In Step 2C, fill a resin 50 into the mold cavity 23 and let the resin 50 flow on the plane 24 along a direction A.

In Step 2D, use the image capture device 42 to record the flowing of the resin 50 to obtain the position of a wave front 51 of the resin 50 on the plane 24 at a time point $t_i$ so as to define on the plane 24 a plurality of measurement positions $x_{i,j}$, whose number amounts to i×j, wherein the time point $t_i$ and the time point $t_{i-1}$, or the time point $t_{i+1}$ and the time point $t_i$, are separated by a sampling interval, and wherein the measurement position $x_{i,j}$ is a position corresponding to the position of the wave front 51 of the resin 50 in the jth transverse row at the time point $t_i$, and wherein the transverse row extends along a direction B that is vertical to a direction A, and wherein i denotes the ith sampling time point, and j is an integer related to n. In the first embodiment, I=1-9, and j=n=1-3.

In Step 2E, respectively set i and j to be preset values a and r, wherein r is an integer greater than 1 and a is an integer greater than or equal to 1; use the image capture device 42 to obtain the measurement positions $x_{r+1}$, $x_{r,a}$ and $x_{r-1,a}$ of the wave front 51 of the resin 50 respectively at the time points $t_{r+1}$, $t_r$ and $t_{r-1}$, which are separated by a sampling interval; use the pressure transducer 411 nearest to the measurement position $x_{r,a}$ to obtain the pressure $P_s$,a of the wave front 51 of the resin 50 at the detection position $y_{s,a}$, wherein $x_{r,a}$ is the wave front position at the current time point and $x_{r+1,a}$ is the wave front position at the next time point in the training process.

Refer to FIG. 7 schematically showing the position of the wave front 51 of the resin 50 at the time point $t_r$ according the first embodiment of the present invention. Let r=9 and a=1. Thus, $t_9$ is the 9th sampling time point for the flowing resin 50. As shown in FIG. 7, the wave front 51 of the resin 50 has reached the pressure transducers 411 at the detection positions $y_{1,1}$ and $y_{2,1}$. The detection position $y_{2,1}$ is the detection position nearest to the measurement position $x_{9,1}$. Thus, let s=2. In fact, the value of s correlates with the measurement position $x^{r,a}$. It is learned via the image capture device 42: the wave front 51 of the resin 50 respectively reaches the measurement positions $x_{9,1}$ and $x_{8,1}$ at time points $t_9$ and $t_8$. As the detection position nearest to the measurement position $x_{9,1}$ is the detection position $y_{2,1}$, the pressure transducer 411 at the detection position $y_{2,1}$ is used to detect the pressure $P_{2,1}$ of the wave front 51 of the resin 50 at the detection position $y_{2,1}$. In the first embodiment, it is supposed: the Seepage velocity of the wave front 51 of the resin 50 along the direction of $y_{1,1}$, $y_{2,1}$ ... $y_{4,1}$ is greater than the Seepage velocity along the direction of $y_{1,2}$, $y_{2,2}$ ... $y_{4,2}$ and the direction of $y_{1,3}$, $y_{2,3}$ ... $y_{4,3}$. Thus, the wave front 51 is distributed as that shown in FIG. 7. In practical applications, the distribution of the detection positions $y_{m,n}$ may be different from that of the first embodiment. The distribution of the measurement positions of the wave front 51 of the resin 50 is dependent on the flowing behavior of the resin 50 and the length of the sampling interval. It should be noted: the first embodiment is only to exemplify the present invention but not to limit the scope of the present invention.

In Step 2F, use the processing unit to obtain the permeability K of a measurement position $x_{r,a}$ with Equation (1):

$$K_{r,a} = \frac{\mu\phi}{P_{s,a}\Delta T}(x_{r,a} - x_{r-1,a})(x_{r,a} - y_{s,a}) \quad (1)$$

wherein $\psi$ is the porosity of the preform, $\mu$ the fluid viscosity of the resin 50, $\Delta T = t_r - t_{r-1}$, whereby is acquired the permeability of the resin 50 at a specified position on the plane 24. In the first embodiment, Equation (1) is equal to Equation (2):

$$K_{9,1} = \frac{\mu\phi}{P_{2,1}\Delta T}(x_{9,1} - x_{8-1})(x_{9,1} - y_{2,1}) \quad (2)$$

wherein $\Delta T = t_9 - t_8$.

Please refer to a Taiwan patent of application No. 103136978 for the details of calculating the permeability, which will not repeat herein.

In Step 2G, repeat Steps 2A-2F to acquire the permeability, the wave front position at the current time point and the wave front position at the next time point of the resin 50 for a plurality of time points in the training process.

In Step 3, define the initial filling pressure, the permeability and the wave front position at the current time point as an input, and define the wave front position at the next time point as an output;

use a data mining technology to establish a prediction-control model involving the input and the output, which is expressed as $$x_{i+1,j} = f(x_{i,j}, P_o, K_{i,j})$$

wherein $P_o$ is the initial filling pressure, the wave front position at the current time point, $x_{i+1,j}$ the wave front position at the next time point, and $K_{i,j}$ the permeability.

In Step 4, undertake a process to be controlled, which uses Steps 2A-2F to acquire the permeability and the wave front position at the current time point in the process to be controlled, use an optimization algorithm to select at least one candidate filling pressure, and substitute the candidate filling pressure, the permeability and the wave front position at the current time point into the prediction-control model, which is established in Step 3, to acquire at least one candidate wave front position at the next time point corresponding to the candidate filling pressure.

In Step 5, compare the candidate wave front positions at the next time point, which are acquired in Step 4, with the expected wave front position at the next time point to find out the candidate wave front position at the next time point, which is nearest to the expected wave front position at the next time point, and use the result to trace back the corresponding candidate filling pressure.

In Step 5 of the first embodiment, establish a preset difference of the candidate wave front position at the next time point and the expected wave front position at the next time point beforehand. If the difference is smaller than the preset difference, the process ends Step 5 and proceeds to the next step. If the difference is greater than the preset difference, the process repeats Step 4 and Step 5 until the difference of the candidate wave front position at the next time point and the expected wave front position at the next time point is smaller than the preset difference. In other words, Step 5 uses the difference of the candidate wave front position at the next time point and the expected wave front position at the next time point to determine the candidate wave front position nearest to the expected wave front position at the next time point.

In Step 6, transmit the candidate filling pressure to the resin supply unit 10, and use the candidate filling pressure as the filling pressure of the next time point to make the resin 50 flow to the expected position of the wave front position of the next time point.

Below is described a second embodiment of the present invention. The difference between the second embodiment and the first embodiment is: in the first embodiment, a plurality of groups of process training conditions is acquired from a plurality of "practical" RTM processes and used to train the prediction-control model; in the second embodiment, a plurality of process simulation conditions is acquired from a plurality of "simulation" RTM processes and used to train the prediction-control process. The second embodiment of the present invention comprises steps stated below.

In Step 1, establish a plurality of groups of process simulation conditions, wherein the process simulation conditions include an initial filling pressure and a permeability.

In Step 2, undertake a plurality of simulation processes according to the process simulation conditions to acquire a wave front position of the resin 50 at the current time point and a wave front position of the resin 50 at the next time point for a plurality of time points of each simulation process.

In Step 3, define the initial filling pressure, the permeability and the wave front position at the current time point as an input, and define the wave front position at the next time point as an output; use a data mining technology to establish a prediction-control model involving the input and the output, which is expressed as $$x_{i+1,j}=f(x_{i,j},P_o,K_{i,j})$$

wherein $P_o$ is the initial filling pressure, $x_{i,j}$ the wave front position at the current time point, $x_{i+1,j}$ the wave front position at the next time point, and $K_{i,j}$ the permeability.

In Step 4, undertake a process to be controlled, which uses Steps 2A-2F mentioned in the first embodiment to acquire the permeability and the wave front position of the resin 50 at the current time point in the process to be controlled, use an optimization algorithm to select at least one candidate filling pressure, and substitute the candidate filling pressure, the permeability and the wave front position at the current time point into the prediction-control model, which is established in Step 3, to acquire at least one candidate wave front position at the next time point corresponding to the candidate filling pressure.

In Step 5, compare the candidate wave front positions at the next time point, which are acquired in Step 4, with the expected wave front position at the next time point to find out the candidate wave front position at the next time point, which is nearest to the expected wave front position at the next time point, and use the result to trace back the corresponding candidate filling pressure. In the second embodiment, please further refer to the related description of the first embodiment for the details of Step 4 and Step 5.

In Step 6, transmit the candidate filling pressure to the resin supply unit 10, and use the candidate filling pressure as the filling pressure of the next time point to make the resin 50 flow to the expected position of the wave front position of the next time point.

In some embodiments of the present invention, the prediction-control model is an artificial neural network; the optimization algorithm is a grid search method; the simulation process is undertaken by the Moldex3D® of the CoreTech System Co., Ltd. In the selection of the expected wave front position of the next time point in the process to be controlled, it is preferable to select one able to cause a uniform flow velocity of the resin 50. Whether the prediction result of the prediction-control model matches the practical process is dependent on whether external factors interfere with the resin 50 in the process to be controlled. For example, inappropriate cutting of the preform or temperature variation may cause the flow behavior of the resin 50 to deviate from the prediction result of the prediction-control model, i.e. the so-called model mismatch. Thus, the present invention further provides a feedback system to overcome the problem of model mismatch. In the feedback system, a proportional-integral controller is used to decrease the influence of the interference factors on the flow behavior of the resin 50 in the molding unit 20 and prevent the flow behavior of the resin 50 from deviating from the prediction result of the prediction-control model.

In conclusion, the present invention proposes a method for real-time controlling a resin transfer molding process, which is used to control the filling pressure of resin in an RTM apparatus, wherein a prediction-control model cooperates with an optimization algorithm to work out a filling pressure enabling the wave front of the resin to flow to the expected position at the next time point, whereby the resin can flow at a uniform velocity. Further, the present invention uses a feedback system to prevent the flow behavior of the resin in the practical process from being deviated from the prediction result of the prediction-control model by some factors, such as inappropriate cutting of the preform or temperature variation. Thereby, the quality of RTM products is guaranteed.

The present invention has been described in detail with the embodiments. However, these embodiments are only to exemplify the present invention but not to limit the scope of the present invention. Any equivalent modification or variation according to the spirit or claim of the present invention is to be also included within the scope of the present invention.

What is claimed is:
1. A method for real-time controlling a resin transfer molding process, which is used to control a filling pressure of a resin in a resin transfer molding (RTM) apparatus, wherein the RTM apparatus comprises a resin supply unit and a molding unit connected with the resin supply unit, and wherein the molding unit includes a mold cavity accommodating a pre-woven fiber object (a preform) and a plane inside the mold cavity, and wherein the method comprises:
Step 1: establishing a plurality of groups of process training conditions, wherein the process training conditions include an initial filling pressure;
Step 2, performing a plurality of training processes according to the process training conditions to acquire a permeability of the resin, a wave front position of the resin at a current time point and a wave front position of the resin at a next time point for a plurality of time points of each training process, wherein the permeability, the wave front position at the current time point and the wave front position at the next time point are acquired with Steps 2A-2F:
Step 2A: defining on the plane a plurality of detection positions $y_{m,n}$ whose number amounts to m×n;
Step 2B: providing a detection module including a pressure transducer unit, at least one image capture device and a processing unit, wherein the pressure transducer unit is arranged in the detection positions $y_{m,n}$, and wherein the image capture device is arranged on one side of the plane, and wherein the processing unit is electrically connected with the pressure transducer unit and the image capture device, and wherein the pressure transducer unit includes m×n pieces of pressure transducers;
Step 2C: filling the resin into the mold cavity with the initial filling pressure and letting the resin flow on the plane along a direction;
Step 2D: using the image capture device to obtain positions of the resin on the plane at a time point $t_i$ so as to define on the plane a plurality of measurement positions whose number amounts to i×j, wherein the time point $t_i$ and a time point $t_{i-1}$, or a time point $t_{i+1}$ and the time point $t_i$, are separated by a sampling interval, and wherein the measurement position $x_{i,j}$ is a position corresponding to a position of a wave front of the resin at the time point $t_i$, and wherein i denotes the ith sampling time point, and j is an integer related to II;
Step 2E: setting i and j to be preset values α and r respectively, wherein r is an integer greater than 1 and α is an integer greater than or equal to 1; using the image capture device to obtain the measurement positions $x_{r+1}$, $x_{r,a}$ and $x_{r-1,a}$ of the resin respectively at the time points $t_{r+1}$, $t_r$ and $t_{r-1}$; and using the pressure transducer, which is nearest to the measurement position $x_{r,a}$ and the resin has reached, to obtain the pressure $P_{s,a}$ of the resin at the detection position $y_{s,a}$, wherein $x_{r+1,a}$ is the wave front position at the current time point and $x_{r+1,a}$ is the wave front position at the next time point in the training process;

Step 2F: using the processing unit to obtain the permeability $K_{r,a}$ of the measurement position $x_{r,a}$ with Equation (1):

$$K_{r,a} = \frac{\mu\phi}{P_{s,a}\Delta T}(x_{r,a} - x_{r-1,a})(x_{r,a} - y_{s,a}) \quad (1)$$

wherein $\psi$ is a porosity of the preform, $\mu$ a fluid viscosity of the resin, $\Delta T = t_r - t_{r-1}$, whereby is acquired the permeability of the resin corresponding to the time point $t_i$ on the plane in the training process;

Step 2G: repeating Steps 2A-2F to acquire the permeability, the wave front position at the current time point and the wave front position at the next time point of the resin for a plurality of time points in the training process;

Step 3: defining the initial filling pressure, the permeability and the wave front position at the current time point as an input, and defining the wave front position at the next time point as an output; using a data mining technology to establish a prediction-control model involving the input and the output, which is expressed as $$x_{i+1,j} = f(x_{i,j}, P_o, K_{i,j})$$

wherein $P_o$ is the initial filling pressure, $x_{i,j}$ the wave front position at the current time point, $x_{i+1,j}$ the wave front position at the next time point, and the permeability;

Step 4: performing a process to be controlled, which uses Steps 2A-2F to acquire the permeability at the current time point and the wave front position at the current time point, using an optimization algorithm to select at least one candidate filling pressure, and substituting the candidate filling pressure, the permeability at the current time point and the wave front position at the current time point into the prediction-control model, which is established in Step 3, to acquire at least one candidate wave front position at the next time point corresponding to the candidate filling pressure;

Step 5: comparing the candidate wave front positions at the next time point, which are acquired in Step 4, with the expected wave front position at the next time point to find out the candidate wave front position at the next time point, which is nearest to the expected wave front position at the next time point, and using the result to trace back the corresponding candidate filling pressure;

Step 6: transmitting the candidate filling pressure to the resin supply unit, and using the candidate filling pressure as the filling pressure of the next time point to make the resin flow to the expected position of the wave front of the next time point.

2. The method for real-time controlling a resin transfer molding process according to claim 1, wherein the prediction-control model is an artificial neural network.

3. A method for real-time controlling a resin transfer molding process, which is used to control a filling pressure of a resin in a resin transfer molding (RTM) apparatus, wherein the RTM apparatus comprises a resin supply unit and a molding unit connected with the resin supply unit, and wherein the molding unit includes a mold cavity accommodating a pre-woven fiber object (a preform) and a plane inside the mold cavity, and wherein the method comprises Step 1: establishing a plurality of groups of process simulation conditions, wherein the process simulation conditions include an initial filling pressure and a permeability;

Step 2: performing a plurality of simulation processes according to the process simulation conditions to acquire a wave front position of the resin at the current time point and a wave front position of the resin at the next time point for a plurality of time points of each simulation process;

Step 3: defining the initial filling pressure, the permeability and the wave front position at the current time point as an input, and defining the wave front position at the next time point as an output; using a data mining technology to establish a prediction-control model involving the input and the output, which is expressed as $$x_{i+1,j} = f(x_{i,j}, P_o, K_{i,j})$$

wherein $P_o$ is the initial filling pressure, $x_{i,j}$ the wave front position at the current time point, $x_{i+1,j}$ the wave front position at the next time point, and $K_{i,j}$ the permeability;

Step 4: performing a process to be controlled to acquire the permeability at the current time point and the wave front position at the current time point, using an optimization algorithm to select at least one candidate filling pressure, and substituting the candidate filling pressure, the permeability at the current time point and the wave front position at the current time point into the prediction-control model, which is established in Step 3, to acquire at least one candidate wave front position at the next time point corresponding to the candidate filling pressure, wherein the permeability at the current time point and the wave front position at the current time point are acquired with Step 4A: defining on the plane a plurality of detection positions $y_{m,n}$ whose number amounts to m×n;

Step 4B: providing a detection module including a pressure transducer unit, at least one image capture device and a processing unit, wherein the pressure transducer unit is arranged in the detection positions $y_{m,n}$, and wherein the image capture device is arranged on one side of the plane, and wherein the processing unit is electrically connected with the pressure transducer unit and the image capture device, and wherein the pressure transducer unit includes m×n pieces of pressure transducers;

Step 4C: filling the resin into the mold cavity with a current filling pressure and letting the resin flow on the plane along a direction;

Step 4D: using the image capture device to obtain a position of a wave front of the resin on the plane at a time point $t_i$ so as to define on the plane a plurality of measurement positions $x_{i,j}$, whose number amounts to i×j, wherein the time point $t_i$ and the time point $t_{i-1}$ are separated by a sampling interval, and wherein the measurement position $x_{i,j}$ is corresponding to a position of the flow front of the resin at the time point $t_i$, and wherein i denotes the ith sampling time point, and j is an integer related to n;

Step 4E: setting i and j to be preset values a and r respectively, wherein r is an integer greater than 1 and a is an integer greater than or equal to 1; using the image capture device to obtain the measurement positions $x_{r,a}$ and $x_{r-1,a}$ of the wave front of the resin respectively at the time points $t_r$ and $t_{r-1}$; and using the pressure transducer, which is nearest to the measurement position $x_{r,a}$ and the resin has reached, to obtain the pressure $P_{s,a}$ of the resin at the detection position $y_{s,a}$, wherein $x_{r,a}$ is the wave front position at the current time point;

Step 4F: using the processing unit to obtain the permeability $K^{r,a}$ of the measurement position $x_{r,a}$ with Equation (1):

$$K_{r,a} = \frac{\mu\phi}{P_{s,a}\Delta T}(x_{r,a} - x_{r-1,a})(x_{r,a} - y_{s,a}) \quad (1)$$

wherein $\psi$ is a porosity of the preform, $\mu$ a fluid viscosity of the resin, $\Delta T = t_r - t_{r-1}$, whereby is acquired the permeability of the resin corresponding to the time point $t_i$ on the plane;

Step 5: comparing the candidate wave front positions at the next time point, which are acquired in Step 4, with the expected wave front position at the next time point to find out the candidate wave front position at the next time point, which is nearest to the expected wave front position at the next time point, and using the result to trace back the corresponding candidate filling pressure;

Step 6: transmitting the candidate filling pressure to the resin supply unit, and using the candidate filling pressure as the filling pressure of the next time point to make the resin flow to the expected position of the wave front of the next time point.

4. The method for real-time controlling a resin transfer molding process according to claim 3, wherein the prediction-control model is an artificial neural network.

* * * * *